United States Patent Office 2,785,068
Patented Mar. 12, 1957

2,785,068

METHOD OF DEVELOPING STARTER AND PRODUCING ANIMAL FEED RICH IN VITAMIN $B_{12}$

Charles T. Hanson, Baltimore, and Howard M. Hodge, Linthicum Heights, Md., assignors to National Distillers Products Corporation, New York, N. Y., a corporation of Virginia No Drawing. Application June 10, 1952,
Serial No. 292,734

9 Claims. (Cl. 99—9)

The present invention relates to the production of animal food supplements containing substantially increased proportions of vitamin B–12 and other unidentified growth promotion factor from vegetable materials composed primarily of carbohydrates and vegetable proteins.

The invention provides a novel method whereby such food supplements may be produced by fermentation of vegetable proteins, and also provides an improved method of growing and enriching bacterial cultures especially adapted to effect such fermentation.

It is well-known that liver, fish products, dried cow manure, and, to a lesser extent, meat scraps, contain one or more growth promoting substances which are necessary for the optimum development and reproduction of poultry, swine, and other non-ruminating animals. This group of vitamins has been known collectively as the animal protein factor. One of these vitamins, B–12, has been isolated in a crystalline form and now appears to be an important, if not the principal, constituent of the so-called animal protein factor. In any event, it is known that the inclusion of vitamin B–12, at levels of 5–15 micrograms per pound of ration, will largely replace the need for proteins of animal origin in practical animal rations.

The addition of vitamin B–12, or of animal growth promotion factor containing substantial proportions thereof permits formulation of animal rations derived almost entirely from more readily available and less expensive vegetable proteins. It is, however, necessary to provide a source of vitamin B–12 in commercial quantities and at a cost which will make it available as a substitute for animal proteins as an additive to vegetable protein rations.

It is an object of the present invention to provide a practical, commercially economical method of producing animal growth promotion factor by the fermentation of vegetable proteins, and especially an animal food supplement containing relatively high proportions of vitamin B–12 and other growth-promotion factor, which will be available for use as an additive to animal rations and for other appropriate purposes.

It is a further object of the present invention to provide means for commercially producing bacterial cultures which will materially promote the formation of vitamin B–12 and accessory growth-promotion factor by the fermentation of vegetable proteins. Further objects of the invention are so to enrich these cultures and to increase the volume thereof to provide effective, adequate quantities for seeding commercial fermentation batches, e. g., 50,000 gallons or more.

These and other objects, as will more fully hereinafter appear, are accomplished by our present invention.

We have discovered that a bacterial culture having the characteristic of extraordinarily promoting the formation of vitamin B–12 and other growth-promotion factor in the fermentation of vegetable proteins may, with advantage, be grown from a mixture of the organisms normally found on soy beans, cotton seed, linseed and cereal grains generally. For convenient reference these materials will hereinafter and in the appended claims be referred to collectively as cereal grain.

We have not been able definitely to identify the specific strain or mixture of specific strains of bacteria which is responsible for promoting this extraordinary development of vitamin B–12 and other growth factor but the essential organism or organisms appear to be generally present on all soy bean and other seed and grain of the type just noted. Organisms from these various sources may be cultured, as herein described, and the cultures enriched and enlarged to proportions suitable for seeding large commercial fermentations, by the herein described methods.

The process of our present invention has been carried out, with particular advantage, where the culture has been developed from raw soy bean meal and a sterile mash of soy bean meal has been used as the medium in which the desired organisms are grown. Soy bean meal has also been used with advantage as a source of the vegetable protein in the fermentation for producing the animal growth-promotion factor rich in vitamin B–12.

It will be understood that, as previously noted, the source of the bacterial mixture from which the culture is grown may be cereal grain other than soy bean. Also, other seed and grain containing substantial proportions of vegetable protein may be used in growing the culture and in the final fermentation stage. However, we shall more particularly describe and illustrate the invention with reference to soy bean meal, which has been found most advantageous.

The process of our present invention in its entirety comprises the following steps:

1. Initial growth and enrichment of the bacterial culture.
2. Fermenter stage.

1. INITIAL GROWTH AND ENRICHMENT OF BACTERIAL CULTURE

According to our present invention, the culture for use in the fermentation may be grown and enriched, for instance, by inoculating a sterile substrate prepared from water and soy bean meal, with a relatively small proportion of raw soy bean meal, permitting the mixture to stand and ferment, advantageously at about room temperature, until fermentation has ceased, adjusting the mixture to an alkaline pH between 7.0 and about 7.5 by the addition of an alkaline material, for instance, aqueous ammonia or sodium hydroxide solution, and permitting the mixture to stand and ferment further, advantageously at about room temperature, until proteolytic organisms develop and proteolysis of the vegetable protein has taken place, as indicated, for instance, by hydrogen sulfide or amino acid formation or the evolution of nitrogen. A portion of the resultant culture is then added to a further sterile medium of soy bean meal and water containing Safranine O dye, advantageously in proportions within the range of about 1 to 5 thousandths part per 100 parts of water, and especially one to two milligrams of the dye per 100 cc. of water. The mixture is permitted to stand and ferment at about room temperature for about 24 hours. A portion of the resultant culture is then used to inoculate a similar sterile medium of soy bean meal and water also containing the Safranine O dye in proportions within the indicated range, and the mixture is permitted to stand and ferment for about 24 hours. The last mentioned step may be repeated, advantageously for a total of about 5 times, each time inoculating a sterile medium with a portion of the last resulting culture. This operation should be carried out under conditions such as will prevent the introduction of wild or stray organisms.

The culture thus prepared will usually be in relatively small quantities inadequate for seeding commercial fermentation batches. However, the quantity of the seed culture may be suitably increased as subsequently described.

In general, large scale seed stages may be prepared from the enriched culture by the following steps: (1) fermenting with aeration a sterile soy bean meal mash with a mixed culture of *Aerobacter aerogenes* and *Proteus vulgaris* for 24–48 hours, (2) adding Safranine O dye in the previous stated proportion, (3) adjusting the broth to an alkaline pH within the range from 7.0 to about 7.5, (4) inoculating the broth with the enriched vitamin B–12 producing culture, and (5) incubating the resultant broth anaerobically at about 86°–90° F. at an alkaline pH within the range of 7.0 to about 7.5.

These steps may be repeated using successively larger quantities of broth until a volume suitable for a large scale inoculum is reached.

The preliminary step (1), noted above, has been found generally advantageous. However, it is not an essential step in the preparation of large scale seed stages.

2. FERMENTER STAGE

The fermenter stage will ordinarily, though not necessarily, be carried out in batches of the order of 50,000 gallons or more of mash. This mash may be prepared in a tank of appropriate size which had been carefully cleaned and sterilized to avoid contamination by stray or wild bacteria. A sterilized mash of soy bean meal and water is charged to the tank, its temperature adjusted to about room temperature and its pH to about 7.5. The sterile mash is then seeded, usually with several thousand gallons of seed culture from the previously developed seeder stage. The pH of the mixture is maintained at about 7.5 by the periodic addition of an alkaline material, for instance, aqueous ammonia or sodium hydroxide solution, and the fermentation allowed to proceed anaerobically for about several days, advantageously about 96 hours.

The resultant broth may then be concentrated, preferably by slightly acidifying and evaporating to a syrup containing 15 to 20% solids which may subsequently be spray dried to produce a dry solid containing the vitamin B–12 and other growth-promotion factor, and the resultant product used as such as an animal food supplement.

Alternatively, the vitamin B–12 content may be separated from the broth, or from the concentrate, or from the spray dried solid, as by conventional methods for recovering vitamins from fermentation mixtures and the like.

The Safranine O dye used in growing and enriching the seed culture, in accordance with our present invention, is, according to Color Index, 1st edition, published in 1924 by the Society of Dyers and Colourists at Bradford, Yorkshire, England, a mixture of diamino-phenylditol-azonium chloride and diamino-o-tolyl-ditolazonium chloride which, respectively, may be represented structurally by the following formulae:

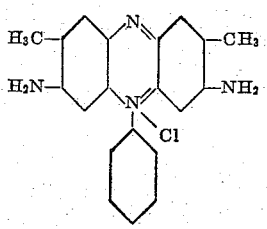

and

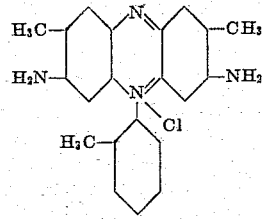

The process of our present invention will be further described and illustrated by the following specific example of one embodiment of the invention which has been used with particular advantage. It will be understood, however, that the invention, in its broader aspect, is not restricted to the particular raw materials or proportions thereof, shown in this example.

EXAMPLE I

1. *Initial growth and enrichment of the bacterial culture*

5 grams of soy bean meal and 200 cc. of water were mixed in a glass flask and the mixture sterilized by autoclaving for 15 minutes and then cooled to room temperature. To this sterile mixture there was added approximately 0.5 gram of raw soy bean meal and the mixture permitted to stand and ferment at about room temperature until fermentation ceased. Aqueous ammonia was then added in an amount sufficient to adjust the mixture to an alkaline pH between 7.0 and 7.5 and the flask was then allowed to stand, with continued fermentation, until proteolytic organisms developed and the proteolysis of the vegetable protein matter had taken place as indicated by hydrogen sulfide and amino acid formation. The resultant culture was then selectively enriched by adding a portion thereof to a sterile medium consisting of 2 grams of soy bean meal and 0.002 gram of Safranine O dye per 100 cc. of water and allowing the mixture to stand and ferment at about room temperature for approximately about 24 hours. A portion of the resultant culture was then transferred to a similar sterile medium of soy bean meal, Safranine O dye and water in the proportions just indicated and the mixture allowed to stand and ferment as before for approximately 24 hours. This last step was repeated five successive times, each time using a portion of the culture from the preceding enrichment step.

2. *Primary preseed stage*

200 gallons of water and 50 pounds of soy bean meal were mixed in a 300 gallon tank, the pH of the mixture adjusted to about 6.5 and the mixture sterilized by heating at a steam pressure of 15 pounds per square inch for one hour. The mash was then cooled to about 86° F. and seeded with two liters of a mixed culture of *Aerobacter aerogenes* and *Proteus vulgaris*. The mash was then allowed to ferment for 24 hours with constant aeration.

3. *Secondary preseed stage*

200 gallons of water, 50 pounds of soy bean meal and 4 grams of Safranine O dye were mixed in a 300 gallon tank, the pH of the mixture adjusted to about 6.5 and the mixture sterilized by heating at a steam pressure of 15 pounds per square inch for one hour. The mash was then cooled to about 86° F. and inoculated with two liters of the enriched seed culture from the initial step. Without aeration, the mash was permitted to stand and ferment at room temperature for about 24 hours and then adjusted to an alkaline pH between 7.0 and 7.5 by the addition of aqueous ammonia and maintained at that pH for 4 to 5 days.

4. *Primary seeder stage*

3,000 gallons of water and 1,000 pounds of soy bean meal were mixed in a 3,500 gallon tank and sufficient aqueous ammonia was added to adjust the pH to about 7.0. The mash was then sterilized by heating at a steam pressure of about 15 pounds per square inch for about one hour and then cooled to about 86° F. To this mash, there was then added the entire culture from the primary preseed stage and the mash permitted to stand with aeration for about 48 hours.

5. Secondary seeder stage

The fermentation mixture resulting from the primary seeder stage was adjusted to an alkaline pH between 7.0 and 7.5 by adding aqueous ammonia. 100 grams of Safranine O dye was then added and the entire culture from the secondary preseed stage mixed therewith. The mixture was then passed to a sterile 12,000 gallon tank and permitted to age anaerobically, the pH being adjusted every few hours to about 7.5 by the addition of aqueous ammonia.

Successive batches from the secondary seeder stage were passed to this 12,000 gallon tank at intervals of two days and on alternate days an equivalent volume of the aged culture was withdrawn for seeding the fermenter. At the beginning of the operation, the seed was aged for 2 to 4 days to the point where it became dark in color. Usually about 3,000 gallons of the aged seed is used for seeding each fermenter batch and each time 3,000 gallons is withdrawn the volume is made up to about 6,000 gallons by adding another batch of seed culture from the secondary seeder stage, this is usually repeated about 5 to 7 times, requiring in all 10 to 14 days. After a maximum of 7 runs, the 12,000 gallon tank is emptied and a fresh batch of aged seed built up as described above.

6. Fermenter stage

A clean fermentation tank of 60,000 gallon capacity was sterilized by steaming for 4 hours. There was then charged to the tank 45,000 gallons of water and 2 pounds of calcium hypochlorite was added to sterilize the water. A sterilized soy bean mash prepared from 12,000 pounds of soy bean meal and 12,000 gallons of water was then added and the resultant mash adjusted to a temperature of about 86° F. and a pH of 7.5. It was then seeded with 3,000 gallons of aged seed from the 12,000 gallon tank of the preceding step and allowed to ferment anaerobically for 96 hours. During this fermentation, the pH was adjusted every 4 hours to about 7.5 by the addition of aqueous ammonia. The resultant broth was slighly acidified by the addition of sulfuric acid and then concentrated by evaporation to a syrupy liquid containing about 15–20% solids. This solid assayed 7–8 milligrams of vitamin B–12 per pound of solid, the assay being made by the assay procedure described in U. S. Pharmacopoeia XIV, 3rd supplement (1951), page 15, and entitled "Microbiological assay for vitamin B–12 activity."

We have found it particularly advantageous, though not essential, to back-feed, or return to the cultures being developed for inoculating the fermenter, a portion of the final fermentation broth from the fermenter stage. Such back-feeding has been found to still further enhance the development of vitamin B–12.

We have, with advantage, supplemented the fermentation mash used in the final stage of the foregoing example by other available sources of vegetable proteins, for instance, evaporated grain fermentation slop. This procedure is illustrated by the following example.

Example II

A mash comprising 7,500 pounds of soy bean meal, 7,500 gallons of water, 1,000 gallons of evaporated grain fermentation slop and 200 pounds of salt (NaCl) was sterilized by heating at a stream pressure of 15 pounds per square inch for one-half hour, added to 40,000 gallons of chlorinated water and seeded with 3,000 gallons of aged seed culture prepared as described in the foregoing example. The seeded mash was then permitted to ferment anaerobically for 96 hours, the pH being adjusted every 4 hours by the addition of aqueous ammonia. Thereafter the broth was acidified by the addition of sulfuric acid, concentrated by evaporation and spray dried. The resultant solid assayed 19.0 milligrams of vitamin B–12 per pound by the previously described procedure.

In the early stages of this fermentation step, the addition of considerable quantities of ammonia is usually necessary to maintain the required pH. Thereafter less ammonia is needed. This is illustrated by the following tabulation showing the amount of ammonia added, if any, at each 4 hour interval during the 96 hour fermentation period of Example II and the pH before and after each addition of the ammonia.

TABLE I

| Elapsed time, hours | pH | Ammonia added, gal. |
|---|---|---|
| — | 6.0–7.5 | 48 |
| 8 | 5.9–7.3 | 150 |
| 12 | 6.7–7.6 | 72 |
| 16 | 6.6–7.6 | 78 |
| 20 | 7.3 | |
| 24 | 6.7–7.5 | 66 |
| 28 | 6.9–7.5 | 36 |
| 32 | 7.3 | |
| 36 | 7.2 | |
| 40 | 7.3 | |
| 44 | 7.3 | |
| 48 | 7.3 | |
| 52 | 7.3 | |
| 56 | 7.2 | |
| 60 | 6.7–7.6 | 54 |
| 64 | 7.5 | |
| 68 | 7.5 | |
| 72 | 7.5 | |
| 76 | 7.2 | |
| 80 | 7.2 | |
| 84 | 7.2 | |
| 88 | 7.2 | |
| 92 | 7.2 | |
| 96 | 7.2 | |

While we cannot explain the precise function of the Safranine O dye, we have found that its presence in the stages of the process wherein the seed culture is grown effects a selective enrichment of the bacterial cultures with respect to the vitamin B–12 forming organisms. This effect is illustrated by the comparative tests described below.

Example III

A series of ten parallel comparative fermentations were carried out, each consisting of a fermentation in which the seed culture was grown and enriched in the presence of Safranine O dye and a control fermentation in which no Safranine O dye was used in preparing the seed culture. The source of the bacteria and the proportions of soy bean meal and water used in preparing the seed cultures were as described in the initial step of Example I and the fermentation conditions were identical in the respective comparative tests. Sterile soy bean meal mashes, free from Safranine O dye, were inoculated with the respective cultures and the mashes anaerobically incubated for like periods of time at 90° F., the pH being maintained alkaline between 7.0 and 7.5 by periodic additions of ammonia. Thereafter the respective final broths were assayed for vitamin B–12, by the previously identified method, and in each instance it was found that the amount of B–12 was substantially greater in the broth resulting from seeding the mash with a culture developed by the use of the Safranine O dye, in accordance with our present invention. The results of these ten parallel tests are set forth in the following Table II, these results being expressed in terms of micrograms of vitamin B–12 per cc. of broth.

Table II.—MICROGRAMS B-12 PER CC. OF BROTH

| No Safranine O dye used | Safranine O dye used |
|---|---|
| 0.16 | 0.24 |
| 0.23 | 0.64 |
| 0.18 | 0.33 |
| 0.14 | 0.29 |
| 0.22 | 0.50 |
| 0.19 | 0.41 |
| 0.20 | 0.50 |
| 0.21 | 0.32 |
| 0.06 | 0.15 |
| 0.09 | 0.20 |
| Average, 0.17 | Average, 0.36 |

It will be seen that the average quantity of B-12 produced by cultures selectively enriched by the use of the Safranine O dye is more than double that produced by cultures in the enrichment of which no Safranine O dye was used.

As previously noted herein there is present in the broth produced in accordance with our present inventions, in addition to vitamin B-12, growth promotion factor not yet identified. Nevertheless its presence has been demonstrated, for instance, by chick growth tests, carried out as follows:

In these tests, four separate groups of Legshire chicks, twenty chicks per group, were given the following basic ration:

| | Lb. per 100 lb. | | Mg. per 100 Gm. Ration |
|---|---|---|---|
| Wheat bran | 5 | Thiamine | 0.3 |
| Wheat middlings | 5 | Riboflavin | 0.6 |
| Dehydrated alfalfa leaf meal | 5 | Niacin | 5.0 |
| | | Calcium pantothenate | 2.0 |
| Soybean oil meal | 50 | Pyridoxine | 0.4 |
| Corn gluten meal | 10 | Inositol | 100 |
| Steamed bone meal | 2 | Choline | 150 |
| Ground yellow corn | 18 | p-Aminobenzoic acid | 10 |
| Granite grits | 2 | Biotin | 0.02 |
| Limestone grits | 2 | Folic Acid | 0.05 |
| Iodized salt | 0.5 | Menadione | 0.05 |
| Fish oil | 0.2 | Alpha tocopherol | 0.3 |
| Manganese sulfate | 0.025 | | |
| Iodinated casein (protamone) | 0.05 | | |

As a negative control one group was fed the above ration without further supplement. For a positive control a second group was fed that ration supplemented by 3% by weight of fish solubles. For a third group the ration was supplemented by crystalline B-12 in an amount equivalent to 30 $\gamma$ per kilogram. For a fourth group the ration was supplemented by 0.26% of the animal food supplement prepared as described in Example I.

The results of these tests are set forth in the following tabulation.

| Supplement | Weight Gain at 8 Weeks, Grams | Response, Using Positive Control as 100%, Percent | Feed Consumed per Bird, Pounds |
|---|---|---|---|
| Negative control—none | 568 | 0 | 5.92 |
| Positive control, 3% fish solubles | 716 | 100.0 | 5.85 |
| 30$\gamma$ Crystalline B$_{12}$ per kg | 703 | 91.2 | 7.25 |
| 0.26% Product of present process | 747 | 121.0 | 5.77 |

From the foregoing data, it appears that the group given the food supplement of our present process not only showed greater gain in weight than those given crystalline B-12, but the food consumption per bird was very materially less.

This invention is in part a continuation of our copending application Serial No. 129,266, filed November 25, 1949, now abandoned.

We claim:
1. Method of producing animal feed supplement rich in vitamin B-12 which comprises (a) inoculating a sterile mash of cereal grain meal with raw, unsterilized cereal grain meal including *Aerobacter aerogenes* and *Proteus vulgaris* bacteria and maintaining the mixture under conditions favoring spontaneous, acid-forming fermentation until such fermentation has ceased; (b) adjusting the pH of the fermented mash resulting from the foregoing step (a) to 7.0–7.5 to initiate proteolytic fermentation and holding the mash until fermentation has ceased; (c) inoculating with the mash from step (b) a sterile mash of cereal grain meal, the pH of which has been adjusted to 7.0–7.5 and to which there has been added about 0.1% to 0.5% of Safranine O dye, and fermenting the resultant mash for about 24 hours; (d) repeating the procedure of the foregoing step (c) a plurality of times, inoculating each successive batch with mash from the preceding batch; (e) fermenting for 24–48 hours, with aeration and a pH of about 6.5, a mash of cereal grain meal which has been sterilized and then inoculated with a mixed culture of *Aerobacter aerogenes* and *Proteus vulgaris*; (f) adding to a separate sterile mash of cereal grain meal about two grams of Safranine O dye per 100 gallons, adjusting the pH to about 6.5 and seeding at about room temperature with a bacterial population resulting from step (d), fermenting the mixture for about 24 hours without aeration and then adjusting the pH of the mash to 7.0–7.5 and maintaining the pH within said range during fermentation for 4 to 5 days; (g) preparing a sterile mash of cereal grain meal in a quantity substantially larger than that used in the preceding steps and inoculating the batch with the fermented mash from step (e), fermenting the batch with aeration for about 48 hours and then adjusting the pH to 7.0–7.5, adding thereto 30–35 grams of Safranine O dye per thousand gallons of the mixture and the fermented mash resulting from step (f), fermenting the resultant mixture anaerobically for about 48 hours while maintaining a pH of 7.0–7.5; (h) preparing a still larger quantity of sterile cereal grain mash, adjusting the temperature of the batch to about room temperature and the pH to 7.0–7.5, seeding the batch with a mixed seed resulting from step (g) and fermenting anaerobically while maintaining a pH of 7.0–7.5; (i) preparing a sterile mash of cereal grain meal of still larger size, adjusting the temperature of the batch to about room temperature and the pH to about 7.5 and seeding the batch with the mash from the preceding step (h) and fermenting the resultant mash anaerobically for about 96 hours while maintaining the pH at about 7.5; and (j) dehydrating the resultant fermented mash.

2. A method of producing animal feed supplement rich in vitamin B-12 by the fermentation of a mash of cereal grain meal which comprises inoculating a sterile mash of cereal grain meal with a starter developed by a procedure comprising the following steps: (a) inoculating a sterile mash of cereal grain meal with raw, unsterilized cereal grain meal including *Aerobacter areogenes* and *Proteus vulgaris* bacteria and maintaining the mixture under conditions favoring spontaneous acid-forming fermentation until such fermentation has ceased; (b) adjusting the pH of the fermented mash, resulting from the foregoing step (a), to 7.0–7.5 to initiate proteolytic fermentation and holding the mash until fermentation has ceased; (c) inoculating with the mash from step (b) a sterile mash of cereal grain meal, the pH of which has been adjusted to 7.0–7.5 and to which there has been added about 0.1% to 0.5% of Safranine O dye, and fermenting the resultant mash for about 24 hours; (d) inoculating with the mash from step (c) a sterile mash of cereal grain meal, the pH of which has been adjusted to 7.0–7.5 and to which there has been added 0.1% to 0.5% of Safranine O dye, fermenting the resultant mash for about 24 hours and (e) repeating the procedure of the foregoing step (d) a total of at least five times, inoculating each batch with mash from the preceding batch, maintaining the first said fermentation at a pH of 7.0–7.5 and holding the fermenting mash without aeration until fermentation has been completed and dehydrating the resultant fermented mash.

3. The process of claim 2 in which the cereal grain meal is soy bean meal.

4. The method of developing a starter capable of enhancing vitamin B–12 production in the fermentation of cereal grain which comprises the following steps: (a) inoculating a sterile mash of cereal grain meal with raw, unsterilized cereal grain meal including *Aerobacter areogenes* and *Proteus vulgaris* bacteria and maintaining the mixture under conditions favoring spontaneous, acid forming fermentation until such fermentation has ceased; (b) adjusting the pH of the fermented mash resulting from the foregoing step (a), to 7.0–7.5 to initiate proteolytic fermentation and holding the mash until fermentation has ceased; (c) inoculating, with the mash from step (b) comprising a mixed culture including *Aerobacter aerogenes* and *Proteus vulgaris* bacteria, a sterile mash of cereal grain meal, the pH of which has been adjusted to 7.0–7.5 and to which there has been added about 0.1% to 0.5% of Safranine O dye, and fermenting the resultant mash for about 24 hours; and (d) repeating the procedure of the foregoing step (c) a plurality of times, inoculating each succeeding batch with mash from the preceding batch.

5. The process of claim 4 in which the raw cereal grain meal used to inoculate the initial sterile mash is soy bean meal.

6. The process of claim 4 in which the sterile mash is of soy bean meal.

7. Method of producing animal feed supplement rich in vitamin B–12 which comprises inoculating a sterile mash of cereal grain meal with a starter developed as in claim 4, maintaining the fermentation at a pH of 7.0–7.5, holding the fermenting mash without aeration until fermentation has been completed and dehydrating the resultant fermented mash.

8. Method of developing a starter capable of enhanced vitamin B–12 production in the fermentation of cereal grain which comprises the following steps: (1) initially developing a culture by (a) inoculating a sterile mash of cereal grain with raw, unsterilized cereal grain meal including *Aerobacter aerogenes* and *Proteus vulgaris* bacteria and maintaining the mixture under conditions favoring spontaneous acid forming fermentation until such fermentation has ceased; (b) adjusting the pH of the fermented mash resulting from the foregoing step (a), to 7.0–7.5 to initiate proteolytic fermentation and holding the mash until fermentation has ceased; (c) inoculating with the mash from step (b) comprising a mixed culture including *Aerobacter aerogenes* and *Proteus vulgaris* bacteria, a sterile mash of cereal grain meal, the pH of which has been adjusted to 7.0–7.5 and to which there has been added about 0.1% to 0.5% of Safranine O dye, and fermenting the resultant mash for about 24 hours; and (d) repeating the procedure of the foregoing step (c) a plurality of times, inoculating each successive batch with mash from the preceding batch; (2) fermenting for 24–48 hours with aeration and at a pH of about 6.5, a mash of cereal grain meal which has been sterilized and then inoculated with a mixed culture of *Aerobacter aerogenes* and *Proteus vulgaris* bacteria; (3) adding to a separate sterile mash of cereal grain meal about two grams of Safranine O dye per 100 gallons, adjusting the pH to about 6.5 and seeding at about room temperature with a bacterial population prepared as in step (1), fermenting the mixture for about 24 hours without aeration and then adjusting the pH of the mash to 7.0–7.5 and maintaining the pH within said range during fermentation for 4 to 5 days; (4) preparing a sterile mash of cereal grain meal in a quantity larger than that used in the preceding steps and inoculating the batch with the fermented mash from step (2), fermenting the batch with aeration for about 48 hours then adjusting the pH to 7.0–7.5, adding thereto 30–35 grams of Safranine O dye per thousand gallons of the mixture and the fermented mash resulting from step (3), fermenting the resultant mixture anaerobically for about 48 hours while maintaining a pH of 7.0–7.5; (5) preparing a still larger quantity of sterile cereal grain mash, adjusting the temperature of the batch to about room temperature and the pH to 7.0–7.5, seeding the batch with the mixed seed resulting from step (4), and fermenting anaerobically while maintaining the pH at 7.0–7.5.

9. The process of claim 8 in which a portion of the broth resulting from step (5) is introduced into the second fermentation stage of step (4).

References Cited in the file of this patent
UNITED STATES PATENTS

| | | |
|---|---|---|
| 2,326,425 | Arzberger | Aug. 10, 1943 |
| 2,447,814 | Novak | Aug. 24, 1948 |
| 2,449,340 | Tanner | Sept. 14, 1948 |
| 2,515,135 | Petty | July 11, 1950 |
| 2,561,364 | Hall | July 24, 1951 |
| 2,576,932 | Garibaldi | Dec. 4, 1951 |
| 2,595,499 | Wood et al. | May 6, 1952 |
| 2,703,302 | Rickes et al. | Mar. 1, 1955 |

OTHER REFERENCES

Levine et al.: A Compilation of Culture Media for the Cultivation of Microorganisms, Williams and Wilkins, Baltimore, 1930, p. 648.

Porter: Bacterial Chemistry and Physiology, Wiley, pp. 326, 327.

Bergey's Manual of Determinative Bacteriology, 6th ed., Williams and Wilkins, pp. 445, 446, 447, 771, 794, 800–801.

Abelson et al.: Science, vol. 110, November 25, 1949, p. 566.

Dyke: Lancet, 1, No. 11, March 18, 1950, pp. 486–488.

Hall et al.: Proc. 50th Meeting Soc. Am. Bact., 1950.

Leviton et al.: I. and E. Chem., 44, 11, November 1952, pp. 2651–2655.

Underkoffler et al.: Industrial Fermentations, vol. II, Chem. Pub. Co., 1954, p. 206.